(12) United States Patent
Kravets

(10) Patent No.: US 8,600,331 B2
(45) Date of Patent: Dec. 3, 2013

(54) RADIO RECEIVER WITH RECONFIGURABLE BASEBAND CHANNEL FILTER

(75) Inventor: Oleksiy Kravets, Petersburg (CA)

(73) Assignee: Black Berry Limited (CA)

( * ) Notice: Subject to any disclaimer, the term of this patent is extended or adjusted under 35 U.S.C. 154(b) by 57 days.

(21) Appl. No.: 13/444,010

(22) Filed: Apr. 11, 2012

(65) Prior Publication Data

US 2013/0273871 A1    Oct. 17, 2013

(51) Int. Cl.
*H04B 1/10* (2006.01)

(52) U.S. Cl.
USPC ............ 455/307; 455/296; 455/339; 455/340

(58) Field of Classification Search
USPC ......... 455/307, 309, 311, 339, 340, 312, 334, 455/130, 176.1, 180.1, 277.2, 249.1, 278.1, 455/296, 299
See application file for complete search history.

(56) References Cited

U.S. PATENT DOCUMENTS

| | | | | |
|---|---|---|---|---|
| 4,977,615 | A * | 12/1990 | Suzuki et al. | 455/277.2 |
| 5,097,221 | A | 3/1992 | Miller | |
| 5,125,105 | A * | 6/1992 | Kennedy et al. | 455/164.1 |
| 5,493,717 | A * | 2/1996 | Schwarz | 455/306 |
| 6,178,314 | B1 | 1/2001 | Whikehart et al. | |
| 6,577,258 | B2 | 6/2003 | Ruha et al. | |
| 7,181,184 | B1 * | 2/2007 | Dimeo et al. | 455/296 |
| 7,199,739 | B2 | 4/2007 | May | |
| 7,215,269 | B2 | 5/2007 | Lee et al. | |
| 7,230,557 | B1 | 6/2007 | Burk et al. | |
| 7,386,078 | B2 | 6/2008 | Dieterich et al. | |
| 7,515,078 | B2 | 4/2009 | May | |
| 7,697,898 | B2 * | 4/2010 | Raj et al. | 455/67.13 |
| 7,791,515 | B2 | 9/2010 | Fifield | |
| 8,095,095 | B2 * | 1/2012 | Saito et al. | 455/130 |
| 8,135,370 | B2 * | 3/2012 | Kobayashi | 455/266 |
| 2003/0081706 | A1 | 5/2003 | Ciccarelli et al. | |
| 2003/0157910 | A1 | 8/2003 | Bruckmann et al. | |
| 2005/0164665 | A1 * | 7/2005 | Suganuma | 455/278.1 |
| 2007/0080843 | A1 | 4/2007 | Lee et al. | |
| 2007/0176819 | A1 | 8/2007 | May | |
| 2009/0135035 | A1 | 5/2009 | Fifield | |
| 2010/0272204 | A1 | 10/2010 | Fazel et al. | |

OTHER PUBLICATIONS

European Search Report, EP12163805, Sep. 19, 2012.

(Continued)

*Primary Examiner* — Pablo Tran

(57) ABSTRACT

A radio receiver circuit configured to receive a radio frequency signal and produce a baseband signal as an output therefrom has a channel filter having a bandwidth, the channel filter configured to receive the baseband output at a filter input and produce a filtered output at a filter output thereof. A signal-to-noise ratio (SNR) estimator prior to or after the channel filter or both is configured to estimate a signal-to-noise ratio of the baseband signal. A filter controller is configured to receive the signal-to-noise ratio estimate and control the channel filter to adjust the bandwidth thereof in accord with the signal-to-noise ratio estimate. This process thereby assists in improving SNR after the channel filtering by varying the channel filter bandwidth. This abstract is not to be considered limiting, since other embodiments may deviate from the features described in this abstract.

27 Claims, 5 Drawing Sheets

(56) References Cited

OTHER PUBLICATIONS

A. Baschirotto, R. Castello, F. Campi, G. Cesura, M. Toma, R. Guerrieri, R. Lodi, L. Lavagno, and P. Malcovati. Baseband Analog Front-End and Digital Back-End for Reconfigurable Multi-Standard Terminals. *Circuits and Systems Magazine, IEEE*, 6(1):8-28, First Quarter 2006.

G. Hueber, L. Maurer, G. Strasser, K. Chabrak, R. Stuhlberger, and R. Hagelauer, "On the Design of a Multi-Mode Receive Digital-Front-End for Cellular Terminal RFICs," *European Conference on Wireless Technology*, Oct. 2005.

R. Veljanovski, et al., "A low-power reconfigurable digital pulse-shaping filter for an utra-TDD Mobile Terminal Receiver", The 2002 45th., Midwest Symposium on Circuits and Systems., Conference Proceedings., Tulsa, Aug. 4-7, 2002, vol. 2, Aug. 4, 2002, pp. 1-4, XP010635309.

\* cited by examiner

RADIO RECEIVER WITH RECONFIGURABLE BASEBAND CHANNEL FILTER

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

In radio receivers, often a baseband channel filter is utilized to separate desirable signals that have been transmitted by a transmitter from undesirable signals (all of which are generally considered noise) that include adjacent channel signals, interference and noise. The bandwidth of such channel filters is usually determined as a compromise between passing all of the desirable signals and rejecting unwanted signal energy for a wide variety of changing real world applications. This compromise is seldom optimum and limits the quality of communication.

BRIEF DESCRIPTION OF THE DRAWINGS

Example embodiments of the present disclosure will be described below with reference to the included drawings such that like reference numerals refer to like elements and in which.

DETAILED DESCRIPTION

Figure 1:
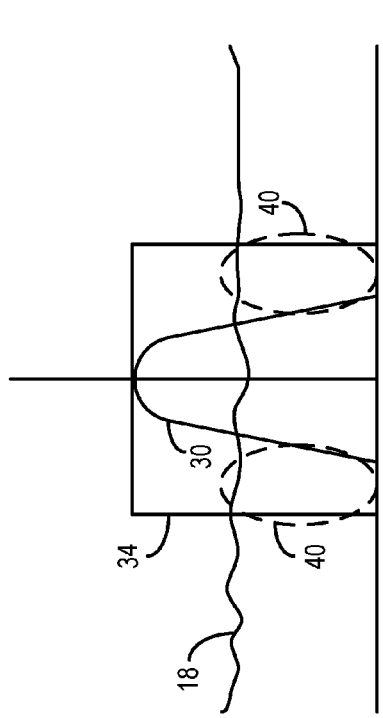
FIG. 1 depicts an example of a baseband spectrum overlaid with an associated channel filter characteristics with overly narrow bandwidth in a high signal-to-noise ratio environment.

The various examples presented herein outline methods, and electronic devices that estimate signal-to-noise ratio (SNR) in a radio receiver baseband signal and use that estimate to optimize a channel filter's bandwidth.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or "application" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

Reference throughout this document to "one embodiment", "certain embodiments", "an embodiment", "an example", "an implementation", "an example" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As noted above, in radio receivers, often a baseband channel filter is utilized to separate desirable signals that have been transmitted by a transmitter from undesirable signals that include adjacent channel signals, interference and noise. The bandwidth of such channel filters is usually determined as a compromise between passing all of the desirable signals and rejecting unwanted signal energy for a wide variety of changing real world applications. This compromise is seldom optimum and limits the quality of communication. These problems are ameliorated in a system in which signal-to-noise ratio is estimated and that estimate is used to control the bandwidth of a channel filter so as to enhance the signal-to-noise ratio out of the filter by either reducing the bandwidth to block frequency spectrum containing only noise or increasing the bandwidth to capture a greater frequency spectrum containing useful signal.

Thus, in accordance with certain aspects of the present disclosure, there is provided a radio receiver circuit configured to receive a radio frequency signal and produce a baseband signal as an output therefrom has a channel filter having a bandwidth, the channel filter configured to receive the baseband output at a filter input and produce a filtered output at a filter output thereof. A signal-to-noise ratio (SNR) estimator prior to or after the channel filter or both is configured to estimate a signal-to-noise ratio of the baseband signal. A filter controller is configured to receive the signal-to-noise ratio estimate and control the channel filter to adjust the bandwidth thereof in accord with the signal-to-noise ratio estimate. This process thereby assists in improving SNR after the channel filtering by varying the channel filter bandwidth.

In certain implementations, the SNR estimator has a pre-filtering signal-to-noise ratio estimator that estimates a pre-filtering signal-to-noise ratio present at the channel filter input and a post-filtering signal-to-noise ratio estimator that estimates a post-filtering signal-to-noise ratio present at the channel filter output, and the filter controller is configured to receive the pre-filtering SNR estimate and the post-filtering SNR estimate and control the channel filter to adjust the bandwidth thereof in accord with the pre- and post-filtering signal-to-noise ratio estimate. In certain implementations, the SNR estimator has a pre-filtering signal-to-noise ratio estimator that estimates a pre-filtering signal-to-noise ratio present at the channel filter input; and the filter controller is configured to receive the pre-filtering SNR estimate and control the channel filter to adjust the bandwidth thereof in accord with the pre-filtering signal-to-noise ratio estimate.

In certain implementations, the SNR is estimated by calculating a Fast Fourier Transform (FFT) of a frequency spectrum present at the channel filter input.

In certain implementations, the SNR estimator has a post-filtering signal-to-noise ratio estimator that estimates a post-filtering signal-to-noise ratio present at the channel filter output; and the filter controller is configured to receive the post-filtering SNR estimate and control the channel filter to adjust the bandwidth thereof in accord with the post-filtering signal-to-noise ratio estimate.

In certain implementations, a demodulator is provided and the SNR of the baseband signal is estimated at the channel filter output. In certain implementations, the channel filter is realized as a digital filter with the bandwidth of the channel filter selected by selection of a set of channel filter coefficients specified by the filter controller. In certain implementations, the SNR estimate is mapped to the set of channel filter coefficients by the filter controller. In certain implementations, the filter controller is configured to compare a first SNR estimate at the output of the channel filter prior to adjusting the bandwidth of the channel filter with a second SNR estimate at the output of the channel filter after adjusting the bandwidth of the channel filter. If the second SNR estimate is improved over the first SNR estimate, then the adjusted channel filter is retained, and if the second SNR estimate degraded over the first SNR estimate, then the channel filter is readjusted to have the pre-adjustment bandwidth. In certain implementations, the baseband output comprises a baseband output from a decimator. In certain implementations, the radio receiver circuit comprises a direct conversion radio receiver.

A method consistent with certain implementations involves, at a radio receiver circuit, receiving a radio frequency signal and producing a baseband signal as an output therefrom; at a channel filter having a variable bandwidth, receiving the baseband output at a filter input and producing a filtered output at a filter output thereof; estimating a signal-to-noise ratio (SNR) of the baseband signal; and controlling the channel filter bandwidth in accord with the estimate of the SNR of the baseband signal.

In certain implementations, estimating the SNR involves estimating a pre-filtering signal-to-noise ratio present at the channel filter input; estimating a post-filtering signal-to-noise ratio present at the channel filter output; and the controlling involves receiving the pre-filtering SNR estimate and the post-filtering SNR estimate and adjusting the bandwidth of the channel filter therefrom.

In certain implementations, the SNR estimating involves estimating a pre-filtering signal-to-noise ratio present at the channel filter input; and the pre-filtering SNR estimate is used to adjust of the bandwidth of the channel filter. In certain implementations, the SNR is estimated by calculating a Fast Fourier Transform (FFT) of a frequency spectrum present at the channel filter input.

In certain implementations, the SNR estimating involves estimating a post-filtering signal-to-noise ratio present at the channel filter output; and the post-filtering SNR estimate is used to adjust of the bandwidth of the channel filter.

In certain implementations, the SNR is estimated at a demodulator receiving the channel filter output. In certain implementations, the channel filter is implemented as a digital filter and selecting the bandwidth of the channel filter is carried out by selection of a set of channel filter coefficients to control the channel filter bandwidth. In certain implementations, the filter controller is configured to compare a first SNR estimate at the output of the channel filter prior to adjusting the bandwidth of the channel filter with a second SNR estimate at the output of the channel filter after adjusting the bandwidth of the channel filter. If the second SNR estimate is improved over the first SNR estimate, then the adjusted channel filter is retained; and if the second SNR estimate degraded over the first SNR estimate, then the channel filter is readjusted to have the pre-adjustment bandwidth.

In certain implementations, the SNR estimate is mapped to a set of channel filter coefficients. The baseband output is a decimated baseband output that is provided to the channel filter.

Another method consistent with certain implementations involves at a radio receiver circuit, receiving a radio frequency signal and producing a baseband signal as an output therefrom; at a digital channel filter having a variable bandwidth, receiving the baseband output at a filter input and producing a filtered output at a filter output thereof; estimating a pre-filtering signal-to-noise ratio present at the channel filter input; estimating a post-filtering signal-to-noise ratio present at the channel filter output; and selecting a set of channel filter coefficients for use by the channel filter that determine the channel filter bandwidth in accord with the pre-filtering SNR estimate and the post-filtering SNR estimate of the baseband signal. In certain implementations, at least one of the SNR estimates is made by calculating a Fast Fourier Transform (FFT) of a frequency spectrum.

A non-transitory computer readable storage medium consistent with certain implementations stores information that when executed on one or more programmed processors carry out a process involving receiving a baseband signal as an output from a radio receiver; filtering the baseband signal at a channel filter having a variable bandwidth by receiving the baseband output at a filter input and producing a filtered output at a filter output thereof; estimating a signal-to-noise ratio (SNR) of the baseband signal; and controlling the channel filter bandwidth in accord with the estimate of the SNR of the baseband signal. In certain implementations, estimating the SNR involves estimating a pre-filtering signal-to-noise ratio present at the channel filter input; estimating a post-filtering signal-to-noise ratio present at the channel filter output; and where the controlling involves receiving the pre-filtering SNR estimate and the post-filtering SNR estimate and adjusting of the bandwidth of the channel filter therefrom. In certain implementations, at least one of the SNR estimates is made by calculating a Fast Fourier Transform (FFT) of a frequency spectrum.

Turning now to the drawings, FIG. 1 depicts an example of a baseband spectrum 10 overlaying an idealized channel filter bandwidth 14 with overly narrow bandwidth in a high signal-to-noise (SNR) ratio environment. In this illustration, the baseband signal has amplitude that is much greater than the noise and interference level depicted as 18. The useful frequency spectrum 10 exceeds the bandwidth of the channel filter 14. This results in the channel filter being suboptimal and limiting the overall signal spectrum that can be used and the signal-to-noise ratio that can be achieved in the radio receiver. The portions of the radio spectrum (approximated by the dashed oval 20) lying outside the boundaries of the idealized filter bandwidth 14 contain useful power that can either be used to improve error rate or throughput. This filter would be more optimal for purposes of SNR if the bandwidth of the channel filter was wider.

Figure 2:
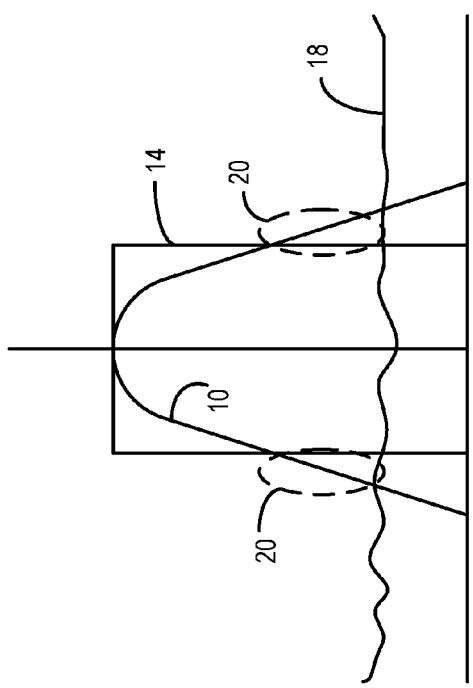
FIG. 2 depicts an example of a baseband spectrum with the associated channel filter's bandwidth characteristics optimized for the high signal-to-noise ratio environment.

FIG. 2 depicts an example of the same baseband spectrum 14 with the associated channel filter's bandwidth optimized for the high signal-to-noise ratio environment. In this case, the channel filter bandwidth 22 is made somewhat wider to take advantage of more of the power present in the signal. The bandwidth 14 of the filter in FIG. 1, while narrower than that of the wider filter bandwidth 22 of FIG. 2, will be referred to as intermediate in bandwidth since it will be further compared to an even narrower bandwidth later.

Figure 3:
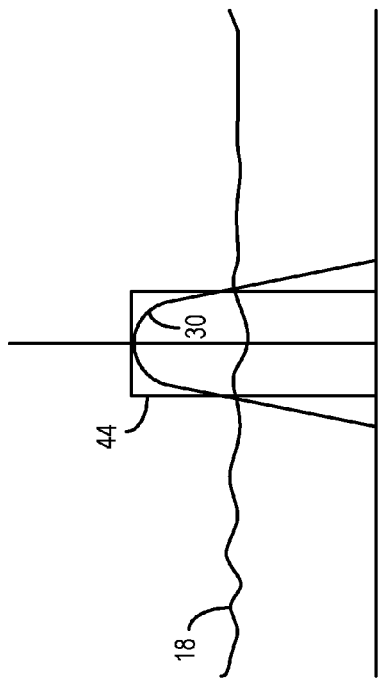
FIG. 3 depicts an example of a baseband spectrum and an associated channel filter characteristics having overly broad bandwidth in a low signal-to-noise ratio environment.

FIG. 3 depicts an example of a baseband spectrum 30 of a signal and an associated channel filter having overly broad idealized bandwidth 34 in a low signal-to-noise ratio environment. In this example, the SNR is much lower than that depicted in FIGS. 1-2, and the channel filter with bandwidth 34 (same bandwidth as shown for 14) allows much more noise to pass, as approximated by the dashed ovals 40. As a result, the unsuppressed noise shown in the areas of dashed ovals 40 represent nearly pure noise resulting in a signal having suboptimal SNR to pass through the channel filter. Virtually all of the signal in the regions approximated by dashed ovals 40 represent signal power that is unusable due to the high noise.

Figure 4:
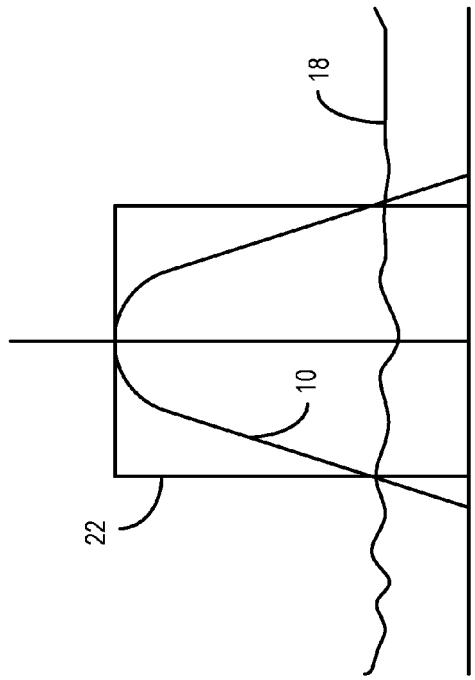
FIG. 4 depicts an example of a baseband spectrum the associated channel filter's bandwidth characteristics optimized for the low signal-to-noise ratio.

FIG. 4 depicts an example of a baseband spectrum and the associated channel filter's bandwidth optimized for the low signal-to-noise ratio. In this example, the bandwidth 44 of the channel filter is reduced to a narrower bandwidth 44 as compared to the wider bandwidth 22 and the intermediate bandwidth 14 of FIG. 1 so that signal 30 is better isolated from the noise thereby increasing the SNR of the signal passed by the channel filter.

It can be seen from the above illustrations that communications under varying communication environments can be coped with more effectively if the bandwidth of a receiver's channel filter can be adapted to the environment.

Figure 5:
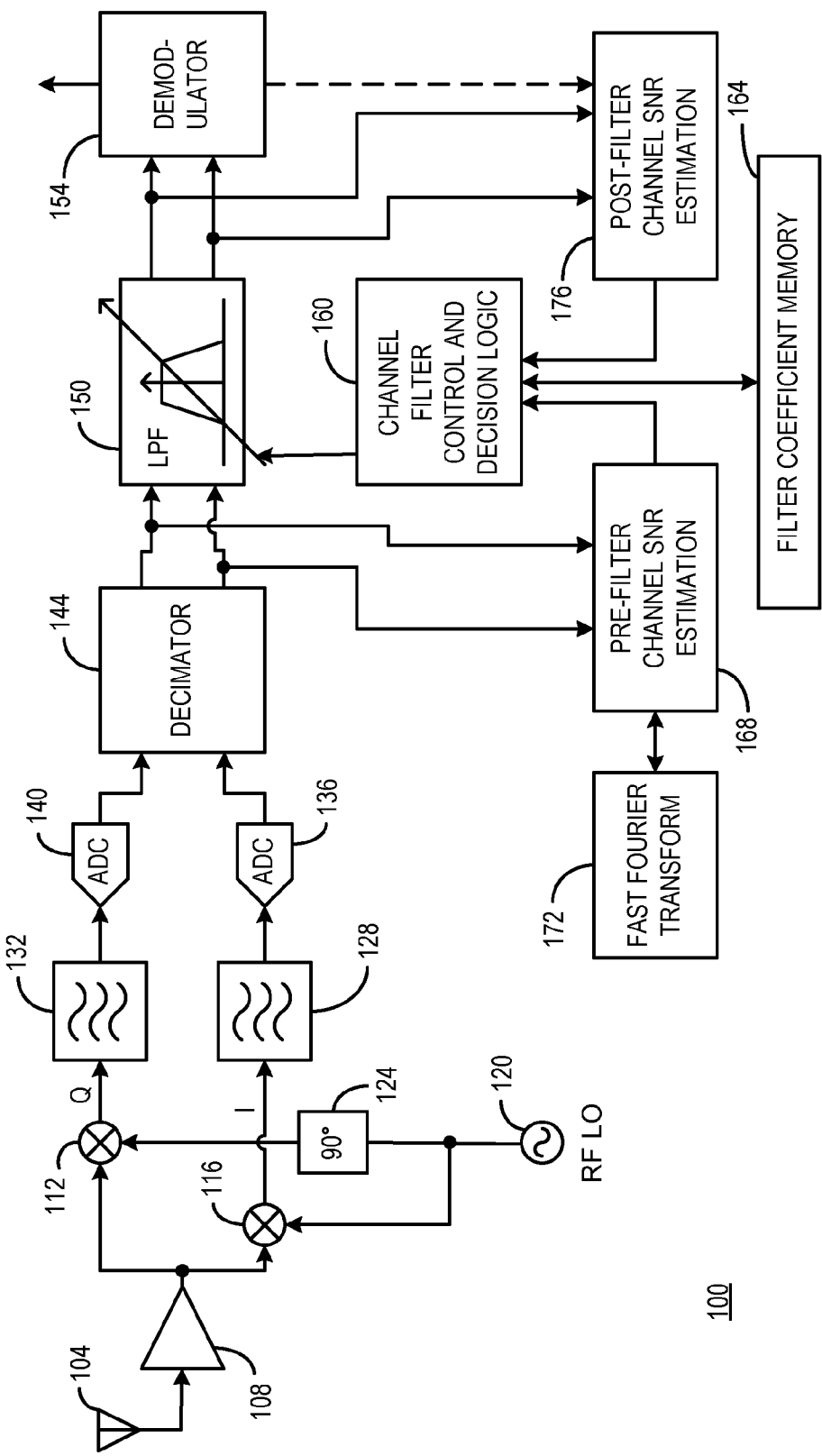
FIG. 5 is an example of a block diagram of a direct conversion radio receiver circuit implementation consistent with the present discussion.

FIG. 5 is a block diagram of an example functional representation of a radio frequency (RF) receiver device 100. In this example, the radio receiver device can be used, for example, for cellular telephone, pager, and data communications such as so-called "smartphones" and the like. This example is based on a homodyne or direct conversion radio which has become popular recently due to reduced circuit complexity since a minimal numbers of mixers, filters and local oscillators are used. Such direct conversion radio circuits can often be realized using a highly integrated mixed (analog and digital) signal integrated circuit to carry most of the components used in implementing the radio. Moreover, once the radio frequency signals are directly converted to baseband and decimated, digital signal processing can be utilized for numerous radio functions.

In this example device 100, radio frequency signals are received at an antenna 104 and may be filtered by a filter (not shown) prior to or after being amplified by a low noise radio frequency (RF) amplifier 108. This radio utilizes no intermediate frequency as with superheterodyne receivers, and so the output of the amplifier 108 is provided to a pair or mixers 112 and 116 without intermediate down-conversion. However, implementations consistent with the present teachings may also be utilized with other radio architectures including, for example, superheterodyne receivers and low intermediate frequency receivers without limitation. Mixers 112 and 116 are utilized to down-convert the RF signal from amplifier 108 directly to baseband and in the process create in-phase and quadrature signals (I and Q respectively). This is done by mixing the output of an RF local oscillator 120 with the RF signal at mixer 116 to produce the I signal. The Q signal is generated by first shifting the phase of the output of local oscillator 120 by 90 degrees at phase shifter 124 and then mixing the phase shifted version of the local oscillator signal at mixer 112.

The I and Q signals are filtered at filters 128 and 132 respectively before being passed to analog-to-digital converters (ADC) 136 and 140 respectively. It is noted that the radio receiver 100 incorporates both analog and digital signal processing which may both be carried out in a mixed signal integrated circuit or may be carried out in separate analog and digital circuitry. Generally speaking, the analog portion of the circuitry appears in FIG. 1 to the left of ADC circuits 136 and 140 and this leftmost portion of the radio is often considered the "analog radio" or "analog portion" of the radio, while the portion to the right of the ADC circuits 136 and 140 are considered the "digital radio" or "digital portion" of the radio with the ADC circuits constituting the transition point of the circuit from analog to digital. The conversion to digital signals creates digitized versions of the I and Q signals for subsequent processing by a decimator 144. The decimator 144 provides anti-aliasing low pass filtering and down-sampling to produce a lower sampling rate digital signal that can be further processed in the receiver.

The output of the decimator generally provides lower sampling rate versions of the I and Q signals that are provided as a decimator output/channel filter input to be filtered by the channel filter 150. In this example implementation, the channel filter 150 is shown as a variable bandwidth low pass filter. In conventional radio receiver devices, channel filter 150 has a fixed bandwidth. In this example, and in most example implementations consistent with embodiments of the invention, the channel filter 150 is realized as a digital filter (e.g., a finite impulse response (FIR) or infinite impulse response (IIR) digital filter). As shown, the filter processes I and Q signals and the I and Q signals are present through the detection process carried out at demodulator 154. But, in other implementations, at any suitable point in the processing the I and Q signals can be converted to a single ended signal as dictated by the particular application. It is noted that the baseband signal is filtered by the channel filter 150, and the channel filter's output is also a baseband signal, albeit a filtered version of the original decimated I and Q values. The term baseband signal is used generically herein to mean both or either filtered and unfiltered baseband I and Q signals.

In accord with the present implementation example, the variable channel filter is controlled by a channel filter control and decision logic block 160. This block 160 in digital implementations controls the characteristics of the digital channel filter 150 by selection and installation of a set of filter coefficients used by the digital channel filter 160. In certain implementations, the channel filter can be realized as, for example, a 24 stage finite impulse response (FIR) filter (i.e., a filter whose impulse response has a finite length), but this is not to be considered limiting since other digital filter realizations are also possible.

In an example FIR filter, the output of the filter is given by a weighted sum of a current signal sample plus a finite number of previously sampled values of the signal. Thus, for an N state FIR filter there are N samples including the current sample $S_n$ and the N−1 prior samples $S_{n-1} \ldots S_{n-N}$ of the signal. These samples are weighted by multiplication of the sample values with N filter coefficients having weighting values (commonly referred to a filter coefficients) that can be in general designated $c_0 \ldots c_N$. In this example, the n index is used to designate the current sample. Thus, the filter output in general is given by:

$$\text{Filter Output}(n) = \sum_{i=0}^{N} c_i S[n-i],$$

where i is a counting integer.

Selection and installation of filter coefficients can be implemented in a number of ways including, but not limited to, computing a set of suitable filter coefficients, adaption of a set of filter coefficients, adding or removing filter sections, or selection of a set of filter coefficients from a plurality of pre-defined and stored filter coefficients. The latter approach is depicted in this example system 100 with multiple sets of filter coefficients being stored in a filter coefficient memory 164 that contains a table of filter coefficients for a range of filter characteristics ranging from a narrowest useful filter bandwidth through one or more intermediate filter bandwidths to a widest useful filter bandwidth. Block 160 selects a set of filter coefficients from memory 164 and loads the filter coefficients into the digital low-pass channel filter 150.

So, for example, in one implementation three ranges of SNR can be used to determine the filter coefficients of the channel filter 150 so as to utilize either a narrow, intermediate or wide bandwidth channel filter (as illustrated in FIG. 1-4). In this example, three sets of filter coefficients $C_{narrow}$, $C_{intermediate}$ and $C_{wide}$ can be used in an example 24 stage FIR filter. The particular filter design is dependent upon the application as are the detected SNR thresholds as estimated, but in this example, the estimated SNR thresholds are set at SNR<10 db, 10 db≤SNRdb≤ISNR, and 20 db<SNR for purposes of providing an illustrative example. The decision as to which filter coefficients are to be installed in channel filter 150 can be generally summarized in the following table in which the filter coefficients are subject to design of the actual filters to achieve the desired characteristics of the narrow, intermediate and wide filters for the particular application at hand:

| SNR Estimate | Example SNR Range | Filter Bandwidth | Coefficient Set |
|---|---|---|---|
| Low | SNR < 10 dB | Narrow | $C_{narrow0} \ldots C_{narrow24}$ |
| Intermediate | 10 db ≤ SNR ≤ 20 dB | Intermediate | $C_{intermediate0} \ldots C_{intermediate24}$ |
| High | 20 db < SNR | Wide | $C_{wide0} \ldots C_{wide24}$ |

While three sets of filter characteristics are depicted in this example, those skilled in the art will appreciate upon consideration of the present teachings that more or fewer sets of filter coefficients could be used. Moreover, other techniques for altering the bandwidth of channel filter 150 are also contemplated.

Referring back to FIG. 5, the decimated I and Q values from decimator 144 are processed by any suitable digital FFT 172 (for example) to determine which parts of the I and Q signals represent signal and which parts represent noise. In one implementation, the ratio of signal-to-noise estimate is computed and used either as a raw number or after conversion to decibels and that number is passed to the channel filter control and decision logic block 160. Block 160 then takes that number representing SNR and utilizes a table similar to that depicted above to select either coefficient set $C_{narrow}$, $C_{intermediate}$ or $C_{wide}$ and installs those filter coefficients into channel filter 150 for use in the channel filtering operation carried out on the decimated I and Q signals from 144.

Block 160 may be implemented as either a programmed processor or as a dedicated hardware logic circuit or any combination thereof. These filter coefficients may serve, for example, as weighting functions that are distributed throughout the filter for weighting delayed versions of the input signal which are summed together to obtain the output signal in a known manner. In operation, the channel filter may start out with a default (compromise) bandwidth determined by an initially loaded set of filter coefficients to operate in much the same way as a fixed filter. From there, the analysis described below is carried out to adjust and adapt the channel filter 150 to provide a more optimal filtering.

When the decimated I and Q signals are output by the decimator 144, they are received as a filter input at channel filter 150 but are also examined by a pre-filter SNR estimation circuit 168. This circuit, that can be either hard wired logic or implemented using a programmed processor, carries out an estimation of the decimated baseband I and Q signal's signal-to-noise ratio. This can be carried out in any number of ways. For example, a Fast Fourier Transform (FFT) operation (which is a form of Digital Fourier Transform or DFT) depicted as 172 can be carried out on the decimated baseband signal to produce a representation of the spectrum of the signal at the channel filter input. This representation of the spectrum can then be used to calculate an estimate of the SNR of the input signal to the channel filter 150. This estimate can be in the form of an actual SNR in dB, a ratio of voltages, a ratio of powers, or individual values of signal and noise powers without limitation. Depending upon various circuit and application parameters, this pre-filtering estimate may be obtained quickly since the signal at the channel filter input is not delayed by the channel filter 150 itself, which imposes a delay.

The signal-to-noise ratio can also be estimated (generally with greater accuracy but slower) at the output of channel filter 150 by use of a post-filter SNR estimation block 176. This block can also utilize FFT analysis on the filtered output of the channel filter 150 or can derive an estimate of SNR using any suitable mechanism. In one example, depicted by use of the dashed line from demodulator 154 to block 176, it is noted that many demodulator circuits 154 already provide for computation of signal-to-noise ratio for various purposes including display of signal quality and as a figure of merit for the receiver's performance, etc. In such cases, the SNR can be computed normally and fed to the control and decision block 160 for processing. Custom processing of this signal at the channel filter 150 output may also be advantageous in the event an optimal filter characteristic can be estimated. In any case, the SNR estimates can be utilized to determine which of a plurality of sets of filter coefficients can be advantageously selected for use by the channel filter 150.

Figure 6:
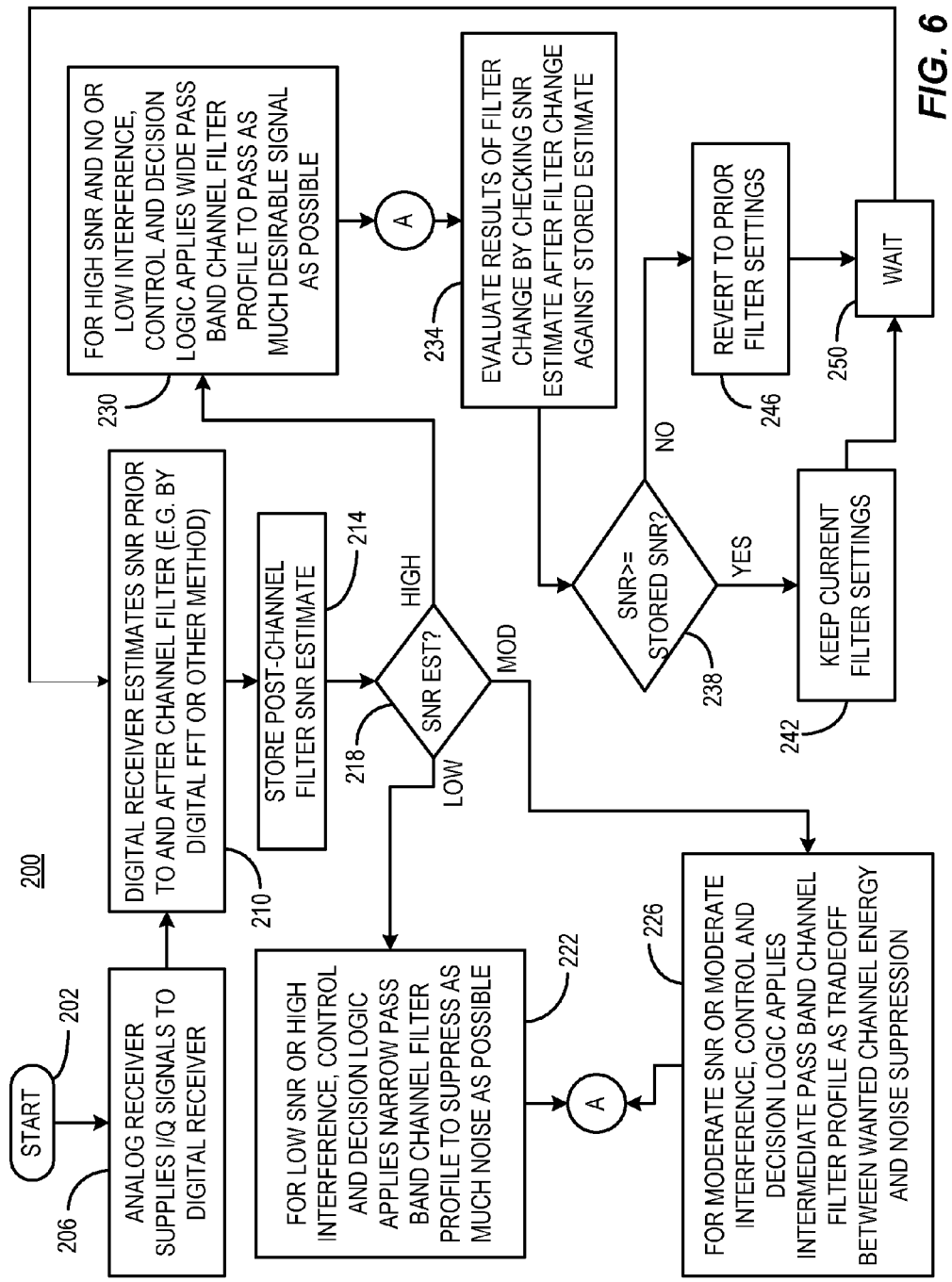
FIG. 6 is an example flow chart depicting one implementation of a channel filter characteristic selection process in accord with the present discussion.

One example implementation of an operational process 200 is depicted in FIG. 6 starting at 202. After initialization and booting operations for the radio 100 are completed, the analog portion of the radio receiver begins supplying I/Q signals to the digital portion of the radio receiver at 206. In this implementation, the digital portion of the receiver begins estimating the SNR, for example at the I/Q signals appearing at the input of the channel filter at 210. This can be done, for example, by use of a digital Fast Fourier Transform (FFT or DFT) or using any other suitable method. In this case, using an FFT provides information about the spectrum frequencies of interest within the desired channel as well as a region extending somewhat beyond the channel, but which can affect the post-filtering SNR if the channel bandwidth is wider than normal.

In the current example, three sets of filter bandwidths corresponding to the three sets of filter coefficients are used to establish the channel filter bandwidth. They will be referred to herein as wide, intermediate and narrow as illustrated earlier in FIGS. 1-4. The actual numerical value of frequency bandwidth for each of these channel filter bandwidth is not essential to the understanding of the present implementation and it will be understood by those skilled in the art that the bandwidth will be determined by the specific application of the radio receiver. However, for purposes of providing an illustrative example, the three passband bandwidths for a Global System for Mobile communication (GSM) second generation (2G) radio receiver application may be approximately 80 KHz (narrow), 100 KHz (intermediate) and 120 KHz (wide) as a starting point, but these bandwidths should only be considered as a starting point for experimentation in this particular radio application and should not be considered limiting. Any number of two or more sets of bandwidth ranges can be used in a manner consistent with the present teachings. These channel filter characteristics are established by loading one of three corresponding sets of stored filter coefficients into the channel filter 150. The channel filter 150 may be initialized using the intermediate bandwidth coefficients as an initialized starting point for filtering in certain implementations.

The SNR estimate taken at 210 includes both a post-filter SNR estimate of the SNR at the output of the channel filter 150 and a pre-filter SNR estimate at the input of the channel filter 150. This post-filter estimate of SNR is stored at 214 for later retrieval. The pre-filter SNR estimate is evaluated at 218 to determine if it is to be considered low, moderate or high for a particular application. Again, the determination of what constitutes high, moderate or low SNR is application specific, and should be determined based on the particular application. For purposes of explanation, and as a reasonable starting point for experimentation using the wide, intermediate and narrow bandwidths above in a GSM 2G cellular telephone receiver, one could start out utilizing below 10 db (low), between 10 db and 20 db inclusive (intermediate) and greater than 20 db (high) as the three threshold ranges for purposes of decision making in the channel filter control and decision logic function 160. It is understood that the above ranges are merely suggested starting points that can be better refined by experimentation in a given receiver architecture and are not to be considered limiting in any manner. It is again noted that in other implementations, at least two such ranges are used, but more than three ranges could be used as desired. The filter characteristics in this example are determined by three corresponding sets of filter coefficients to implement, for example, a finite impulse response (FIR) or infinite impulse response (IIR) digital filter having bandwidth corresponding to the above three example filter bandwidths.

If upon evaluation of the pre-filtering SNR at 218, the SNR is in the low range indicating low signal strength relative to noise or interference or both, the channel control and decision logic 160 selects and applies the narrow pass band bandwidth filter coefficients and installs them into channel filter 150 at 222. If upon evaluation of the pre-filtering SNR at 218, the SNR is in the moderate range indicating moderate signal strength relative to noise or interference or both, the channel control and decision logic 160 selects and applies the intermediate pass band bandwidth filter coefficients and installs them into channel filter 150 at 226. If upon evaluation of the pre-filtering SNR at 218, the SNR is in the high range indicating high signal strength relative to noise or interference or both, the channel control and decision logic 160 selects and applies the wide pass band bandwidth filter coefficients and installs them into channel filter 150 at 230. In each instance 222, 226 and 230, upon completion of installation of the coefficients into the channel filter 150, control passes to 234 where the results of changing the filter coefficients are evaluated. This can be done by a comparison of the post-channel filter SNR estimate stored at 214 with a newly estimated post channel-filter SNR done after installation of the channel filter coefficients installed at 222, 226 or 230.

If at 238, the newly estimated post-filtering SNR is greater than or equal to the previously stored post-filtering SNR stored at 214, the filter change has been successful or at least not detrimental in improving the SNR and the new filter settings are retained. If the post-filtering SNR is less than the SNR stored at 214 then the filter change has been detrimental and the filter control and logic process 160 reverts the channel filter coefficients back to their prior setting at 246. After 242 or 246, the process waits for a specified time (e.g., 10 to 100 milliseconds, for purposes of an illustrative but non-limiting example) at 250 and the process repeats starting at 210 so that the changing environment of the radio receiver can be quickly compensated for by adjustment of the channel filter characteristics. In another example, the pre-filter SNR can be continuously monitored and the entire filter characteristic change process can be initiated in the event of any substantial change in the pre-filter SNR estimation. Other variations will occur to those skilled in the art upon consideration of the present teachings. It is to be noted that all numerical examples given herein are to be considered examples without any intent to limit the bounds of the present teachings.

Many variations of this process will occur to those skilled in the art upon consideration of the present teachings. For example, in certain implementations, the pre-filter SNR estimate may be used to change the default channel filter coefficients as a quick estimate while the post-filter SNR estimate can be utilized to fine tune the filter coefficients to further refine the channel filter properties. In other implementations, the pre- and post-channel filter SNR estimates can be averaged or otherwise combined to refine the estimate of SNR to establish the filter coefficients. The pre-filter SNR estimate can also be utilized to quickly determine that conditions of the channel are changing and to adapt the channel filter accordingly. In other implementations, only one or the other of the SNR estimates may be utilized. Other variations will also occur to those skilled in the art upon consideration of the present teachings.

In certain example implementations, once an estimate of SNR is produced, the channel filter control and decision logic maps the SNR estimate to a prescribed range of signal-to-noise ratios stored in memory with particular SNR ranges having corresponding particular sets of filter coefficients, as illustrated by the table above. This is described in the form of an example set of ranges above. Once a comparison of the SNR with the ranges is completed, the SNR can be mapped to its corresponding set of filter coefficients which can then be loaded into the channel filter 150 in order to effect the change in bandwidth of the channel filter 150. The process can be repeated at regular time intervals to periodically refine the channel filter characteristics to changing conditions. Alternatively, changes in conditions can be detected by significant changes SNR or other signal characteristics and such changes can be used to trigger a change in the channel filter coefficients. As a further alternative, the SNR estimation can be carried out on a continuous basis with the channel filter coefficients being changed whenever a comparison of the current SNR estimate is outside the bounds of the SNR range mapped to the current set of channel filter coefficients. SNR need not be expressed in dB by the block 168 for speed, and various rounding or integer math techniques can be utilized to speed the calculation as desired. Other variations will occur to those skilled in the art upon consideration of the present teachings.

Figure 7:
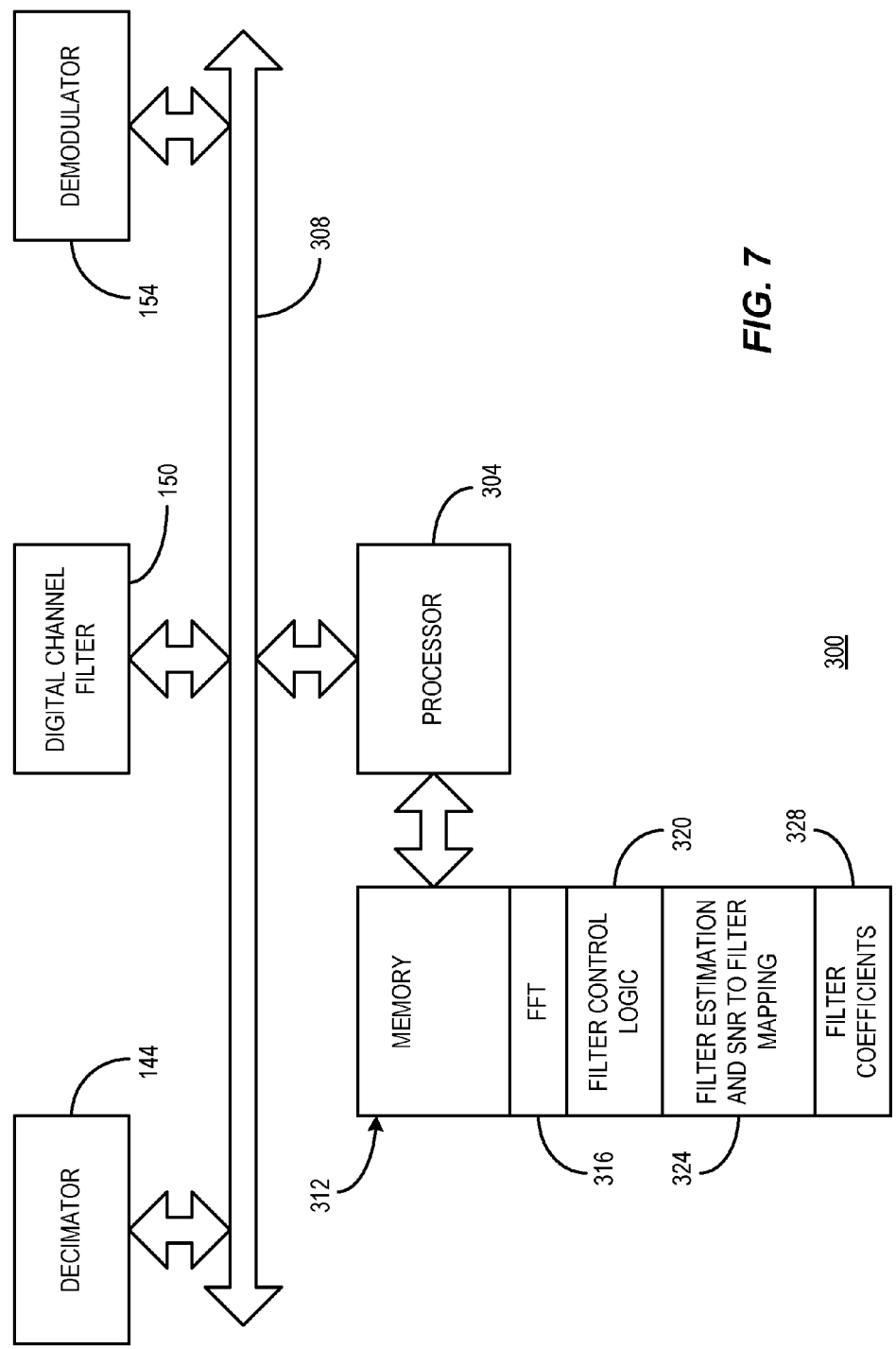
FIG. 7 is an example block diagram depicting the digital portion of a radio receiver consistent with certain implementations.

In certain example implementations as depicted in FIG. 7 the digital portion of radio 100 is shown in simplified form as system 300. In this implementation example, one or more programmable processors represented by processor 304 is utilized to carry out the functions of processing blocks 160, 168, 172 and 176 of radio 100. For ease of illustration, the decimator 144, channel filter 150 and demodulator 154 are shown as separate functional blocks, but these functions may also be carried out in whole or in part using processor 304 or using other processors or utilizing dedicated hardware circuits or any combination of the above without limitation. The functional blocks are shown communicating using a communication bus 308 which is symbolic of one or more communication paths that can be utilized. Multiple bus structures and direct communication between certain of the functional blocks is contemplated and represented in simplified form by communication bus 308.

The processor 304 is coupled to memory 312 made up of any one or more types of storage device technologies such as random access memory (RAM), read only memory (ROM), flash memory, etc. to store functional program blocks that carry out various digital radio functions as described. The FFT program block 316 stores instructions that carry out the FFT function used in block 172. The channel filter control and decision logic block 160 is implemented using program instructions in block 320. The pre-filter SNR estimation function 168 and post-filter SNR estimation function 176 and associated SNR to filter coefficient mapping are carried out using program instructions stored in block 324. The filter coefficients and their mapping to SNR ranges are stored at 328.

Figure 8:
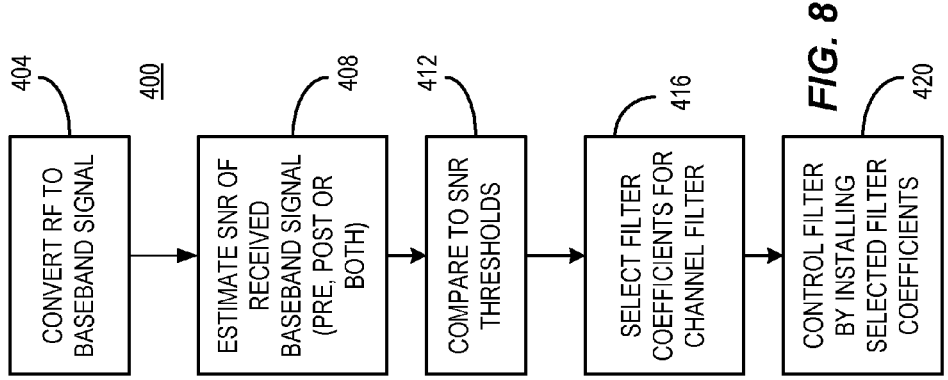
FIG. 8 is an example of a flow chart depicting a filter selection process consistent with the present discussion.

Referring now to FIG. 8, a generalized process consistent with certain implementations is provided as process 400. At 404 the RF signal is converted to baseband, for example using a direct conversion process. An estimate of the baseband SNR is generated at 408 using either a pre- or post-channel filter I/Q signal representing the baseband signal to make the estimate using any suitable process. This SNR estimate is compared to a set of SNR thresholds (one or more thresholds or ranges of SNR values) at 412. In accord with this comparison, a set of filter coefficients is selected at 416 for use in establishing the operational parameters including bandwidth of the channel filter. At 420, such operational parameters are selected for the channel filter, for example by installation of filter coefficients or otherwise modification of the operational attributes of the filter. Many variations are possible without departing from this implementation.

Figure 9:
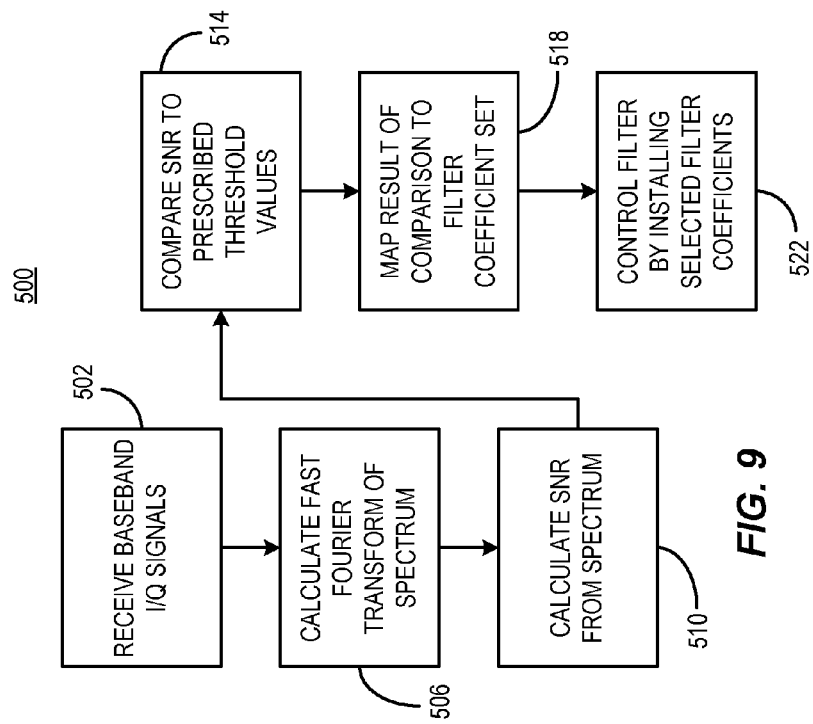
FIG. 9 is another example of a flow chart depicting a filter selection process consistent with the present discussion.

Another example of a generalized process consistent with certain implementations is depicted in FIG. 9 as process 500. At 502, the baseband I/Q signals are received and a FFT is calculated at 506. Once the FFT is calculated, the SNR can be generated from the FFT by identification of the part of the I/Q signals in the frequency domain that constitute signals and determining the power of the signal portion. Everything else is considered noise from the perspective of SNR, so the signal power can be subtracted from the total power or the non-signal power can be separately calculated and the ratio of signal-to-noise constituting the estimated SNR can be calculated at 510. This SNR estimate is compared to prescribed threshold values at 514 and the results are mapped to a set of filter coefficients at 518. The coefficients and SNR ranges can be stored, for example in a table or database within memory 312 at 328. These filter coefficients can then be installed into the channel filter 150 at 522 to establish the filter characteristics including bandwidth at channel filter 150.

The processes 400 and 500 can be iterated or repeated on a periodic basis to account for changes in the noise and interference characteristics of the channel as a result of the continuously changing environment of use of radio 100.

While the blocks representing the methods are shown as occurring in a particular order, it will be appreciated by those skilled in the art that certain of the blocks may be rearranged and can occur in a different order than that shown without materially affecting the end results of the methods.

The implementations of the present disclosure described above are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein. Those skilled in the art will appreciate, upon consideration of the present teaching, that the processes described above, when used in a programmed processor implementation, can be implemented in any number of variations and in many suitable programming languages without departing from the present teachings. For example, the order of certain operations carried out can often be varied, additional operations can be added or operations can be deleted without departing from certain embodiments of the teachings herein. Error trapping can be added and/or enhanced and variations can be made i without departing from the teachings herein. It will be further appreciated that while examples based upon computer programs installed in a processor are depicted, all elements of the digital radio could equivalently be implemented using hardware state machines without departing from the present teachings. Such variations are contemplated and considered equivalent.

It will be appreciated that any module or component disclosed herein that executes instructions may include or otherwise have access to non-transient and tangible computer readable media such as storage media, computer storage media, or data storage devices (removable or non-removable)

such as, for example, magnetic disks, optical disks, or tape data storage. The term "non-transient" is intended only to exclude propagating signals or waves and does not exclude volatile memory or rewritable memory devices. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any application or module herein described may be implemented using computer readable/executable instructions that may be stored or otherwise held by such computer readable media. Similarly, while the examples shown depict functional blocks that may be implemented by installation of programming onto a computer, the functional blocks can equivalently be implemented using hard wired logic and the like without deviation for implementations consistent with embodiments of the present invention.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A device, comprising:
    a radio receiver circuit configured to receive a radio frequency signal and produce a baseband signal as an output therefrom;
    a channel filter having a bandwidth, the channel filter configured to receive the baseband output at a filter input and produce a filtered output at a filter output thereof;
    a signal-to-noise ratio (SNR) estimator configured to estimate a pre-filtering and post-filtering signal-to-noise ratio of the baseband signal present at the channel filter input; and
    a filter controller configured to receive the signal-to-noise ratio estimate and control the channel filter to adjust the bandwidth thereof in accord with the signal-to-noise ratio estimate.

2. The device in accordance with claim 1, where the SNR estimator further comprises:
    a pre-filtering signal-to-noise ratio estimator that estimates the pre-filtering signal-to-noise ratio present at the channel filter input;
    a post-filtering signal-to-noise ratio estimator that estimates the post-filtering signal-to-noise ratio present at the channel filter output; and
    the filter controller configured to receive the pre-filtering SNR estimate and the post-filtering SNR estimate and control the channel filter to adjust the bandwidth thereof in accord with the pre- and post-filtering signal-to-noise ratio estimate.

3. The device in accordance with claim 1, where the SNR estimator further comprises:
    a pre-filtering signal-to-noise ratio estimator that estimates the pre-filtering signal-to-noise ratio present at the channel filter input; and
    the filter controller configured to receive the pre-filtering SNR estimate and control the channel filter to adjust the bandwidth thereof in accord with the pre-filtering signal-to-noise ratio estimate.

4. The device in accordance with claim 3, where the SNR is estimated by calculating a Fast Fourier Transform (FFT) of a frequency spectrum present at the channel filter input.

5. The device in accordance with claim 1, where the SNR estimator further comprises:
    a post-filtering signal-to-noise ratio estimator that estimates the post-filtering signal-to-noise ratio present at the channel filter output; and
    the filter controller configured to receive the post-filtering SNR estimate and control the channel filter to adjust the bandwidth thereof in accord with the post-filtering signal-to-noise ratio estimate.

6. The device in accordance with claim 5, further comprising a demodulator where the SNR of the baseband signal is estimated at the channel filter output.

7. The device in accordance with claim 1, where the channel filter comprises a digital filter with the bandwidth of the channel filter selected by selection of a set of channel filter coefficients specified by the filter controller.

8. The device in accordance with claim 1, where the SNR estimate is mapped to the set of channel filter coefficients by the filter controller.

9. The device in accordance with claim 1, where the filter controller is configured to compare a first SNR estimate at the output of the channel filter prior to adjusting the bandwidth of the channel filter with a second SNR estimate at the output of the channel filter after adjusting the bandwidth of the channel filter;
    if the second SNR estimate is improved over the first SNR estimate, then the adjusted channel filter is retained; and
    if the second SNR estimate degraded over the first SNR estimate, then the channel filter is readjusted to have the pre-adjustment bandwidth.

10. The device in accordance with claim 1, where the baseband output comprises a baseband output from a decimator.

11. The device in accordance with claim 1, where the radio receiver circuit comprises a direct conversion radio receiver.

12. A method, comprising:
    at a radio receiver circuit, receiving a radio frequency signal and producing a baseband signal as an output therefrom;
    at a channel filter having a variable bandwidth, receiving the baseband output at a filter input and producing a filtered output at a filter output thereof;
    estimating a pre-filtering and post-filtering signal-to-noise ratio (SNR) of the baseband signal present at the channel filter input; and
    controlling the channel filter bandwidth in accord with the estimate of the SNR of the baseband signal.

13. The method in accordance with claim 12, where estimating the SNR further comprises:
    estimating the pre-filtering signal-to-noise ratio present at the channel filter input;
    estimating the post-filtering signal-to-noise ratio present at the channel filter output; and
    where the controlling comprises receiving the pre-filtering SNR estimate and the post-filtering SNR estimate and adjusting the bandwidth of the channel filter therefrom.

14. The method in accordance with claim 12, where the SNR estimating further comprises:
    estimating the pre-filtering signal-to-noise ratio present at the channel filter input; and where the pre-filtering SNR estimate is used to adjust of the bandwidth of the channel filter.

15. The method in accordance with claim 14, where the SNR is estimated by calculating a Fast Fourier Transform (FFT) of a frequency spectrum present at the channel filter input.

16. The method in accordance with claim 12, where the SNR estimating further comprises:
    estimating the post-filtering signal-to-noise ratio present at the channel filter output; and
    where the post-filtering SNR estimate is used to adjust of the bandwidth of the channel filter.

17. The method in accordance with claim 16, further comprising estimating SNR at a demodulator receiving the channel filter output.

18. The method in accordance with claim 12, where the channel filter comprises a digital filter and further comprising selecting the bandwidth of the channel filter by selection of a set of channel filter coefficients to control the channel filter bandwidth.

19. The method in accordance with claim 12, where the filter controller is configured to compare a first SNR estimate at the output of the channel filter prior to adjusting the bandwidth of the channel filter with a second SNR estimate at the output of the channel filter after adjusting the bandwidth of the channel filter;
    if the second SNR estimate is improved over the first SNR estimate, then the adjusted channel filter is retained; and
    if the second SNR estimate degraded over the first SNR estimate, then the channel filter is readjusted to have the pre-adjustment bandwidth.

20. The method in accordance with claim 12, further comprising mapping the SNR estimate to a set of channel filter coefficients.

21. The method accordance with claim 12, where the baseband output comprises a decimated baseband output.

22. A method, comprising:
    at a radio receiver circuit, receiving a radio frequency signal and producing a baseband signal as an output therefrom;
    at a digital channel filter having a variable bandwidth, receiving the baseband output at a filter input and producing a filtered output at a filter output thereof;
    estimating a pre-filtering signal-to-noise ratio present at the channel filter input;
    estimating a post-filtering signal-to-noise ratio present at the channel filter output; and
    selecting a set of channel filter coefficients for use by the channel filter that determine the channel filter bandwidth in accord with the pre-filtering SNR estimate and the post-filtering SNR estimate of the baseband signal.

23. The method in accordance with claim 22, where at least one of the SNR estimates is made by calculating a Fast Fourier Transform (FFT) of a frequency spectrum.

24. A non-transitory computer readable storage medium storing information that when executed on one or more programmed processors carry out a process, comprising:
    receiving a baseband signal as an output from a radio receiver;
    filtering the baseband signal at a channel filter having a variable bandwidth by receiving the baseband output at a filter input and producing a filtered output at a filter output thereof;
    estimating a pre-filtering and post-filtering signal-to-noise ratio (SNR) of the baseband signal present at the channel filter input; and
    controlling the channel filter bandwidth in accord with the estimate of the SNR of the baseband signal.

25. The storage medium in accordance with claim 24, where estimating the SNR comprises:
    estimating the pre-filtering signal-to-noise ratio present at the channel filter input;
    estimating the post-filtering signal-to-noise ratio present at the channel filter output; and
    where the controlling comprises receiving the pre-filtering SNR estimate and the post-filtering SNR estimate and adjusting of the bandwidth of the channel filter therefrom.

26. The storage medium in accordance with claim 24, where at least one of the SNR estimates is made by calculating a Fast Fourier Transform (FFT) of a frequency spectrum.

27. A device, comprising:
    a radio receiver circuit configured to receive a radio frequency signal and produce a baseband signal as an output therefrom;
    channel filtering means having a bandwidth, the channel filtering means for receiving the baseband output at a filter input and producing a filtered output at a filter output thereof;
    signal-to-noise ratio (SNR) estimating means for estimating a pre-filtering and post-filtering signal-to-noise ratio of the baseband signal; and
    filter controlling means for receiving the signal-to-noise ratio estimate and controlling the channel filtering means to adjust the bandwidth thereof in accord with the signal-to-noise ratio estimate.

\* \* \* \* \*